(12) United States Patent
Messing et al.

(10) Patent No.: US 11,644,007 B2
(45) Date of Patent: May 9, 2023

(54) ROTOR BLADE FOR A WIND TURBINE AND WIND TURBINE

(71) Applicant: Wobben Properties GmbH, Aurich (DE)

(72) Inventors: Ralf Messing, Aurich (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 76 days.

(21) Appl. No.: 17/259,881

(22) PCT Filed: Jul. 18, 2019

(86) PCT No.: PCT/EP2019/069351
§ 371 (c)(1),
(2) Date: Jan. 12, 2021

(87) PCT Pub. No.: WO2020/016351
PCT Pub. Date: Jan. 23, 2020

(65) Prior Publication Data
US 2021/0222671 A1 Jul. 22, 2021

(30) Foreign Application Priority Data
Jul. 18, 2018 (DE) .................. 10 2018 117 398.9

(51) Int. Cl.
*F03D 1/06* (2006.01)
*F03D 7/02* (2006.01)

(52) U.S. Cl.
CPC ......... *F03D 1/0675* (2013.01); *F03D 1/0658* (2013.01); *F03D 7/022* (2013.01); *F05B 2240/3062* (2020.08)

(58) Field of Classification Search
CPC ........ F03D 1/0675; F03D 1/0658; F03D 1/06; F03D 7/022; F05B 2240/3062; Y02E 10/72
See application file for complete search history.

(56) References Cited

U.S. PATENT DOCUMENTS 5,058,837 A * 10/1991 Wheeler ................. B64C 23/06
244/200.1
9,133,816 B2 * 9/2015 Jensen .................. F03D 1/0675
(Continued)

FOREIGN PATENT DOCUMENTS

EP 2548801 A1 1/2013
EP 3211220 8/2017
(Continued)

*Primary Examiner* — David E Sosnowski
*Assistant Examiner* — Wayne A Lambert
(74) *Attorney, Agent, or Firm* — Seed Intellectual Property Law Group LLP

(57) ABSTRACT

A rotor blade, with a suction side and a pressure side, for a wind turbine, having a rotor blade root of a hub region for attaching the rotor blade to a rotor hub, a rotor blade tip, which is arranged on a side, facing away from the rotor blade root, of a tip region, at least one vortex generator, which is arranged between the rotor blade root and the rotor blade tip, wherein the at least one vortex generator comprises swirl elements with a length and a height, which are arranged one next to the other in a longitudinal direction of the rotor blade and are in each case oriented at an angle to a main flow direction of the rotor blade, wherein, in the longitudinal direction of the rotor blade, the swirl elements have a lateral spacing to one another. A variation in the geometry of the swirl elements is realized in a manner dependent on a respective distance between the arrangement of the swirl elements and the rotor blade root.

10 Claims, 5 Drawing Sheets

(56) References Cited

U.S. PATENT DOCUMENTS

| | | | |
|---|---|---|---|
| 9,624,782 B2* | 4/2017 | Booth | F03D 1/0675 |
| 9,869,297 B2 | 1/2018 | Tobin et al. | |
| 10,808,676 B2* | 10/2020 | Harada | F03D 1/0633 |
| 2008/0175711 A1* | 7/2008 | Godsk | F03D 80/00 |
| | | | 416/235 |
| 2009/0087314 A1* | 4/2009 | Haag | F03D 7/0224 |
| | | | 416/223 R |
| 2012/0282105 A1* | 11/2012 | Grife | F03D 1/0675 |
| | | | 249/102 |
| 2013/0129520 A1* | 5/2013 | Enevoldsen | F03D 1/0608 |
| | | | 416/235 |
| 2014/0140856 A1 | 5/2014 | Madsen et al. | |
| 2014/0219810 A1* | 8/2014 | Wurth | F01D 5/145 |
| | | | 416/235 |
| 2014/0328692 A1 | 11/2014 | Riddell et al. | |
| 2014/0328693 A1 | 11/2014 | Wilson et al. | |
| 2015/0204306 A1 | 7/2015 | Herr et al. | |
| 2015/0322791 A1* | 11/2015 | Flach | F03D 1/0675 |
| | | | 156/60 |
| 2015/0361952 A1* | 12/2015 | Petsche | F03D 1/0633 |
| | | | 416/223 A |
| 2016/0222941 A1* | 8/2016 | Tobin | F03D 13/10 |
| 2017/0045031 A1* | 2/2017 | Asheim | F03D 1/0633 |
| 2017/0248117 A1* | 8/2017 | Fukami | F03D 1/0683 |
| 2019/0003451 A1* | 1/2019 | Harada | F03D 1/0675 |
| 2019/0010917 A1* | 1/2019 | Harada | F03D 1/0675 |
| 2019/0120204 A1* | 4/2019 | Harada | F03D 1/0675 |
| 2019/0120205 A1* | 4/2019 | Harada | F03D 1/0641 |

FOREIGN PATENT DOCUMENTS

| | | |
|---|---|---|
| EP | 3309388 A1 | 4/2018 |
| EP | 3348824 A1 | 7/2018 |
| RU | 2118699 | 9/1998 |
| WO | 2010/033018 A2 | 3/2010 |

* cited by examiner

ROTOR BLADE FOR A WIND TURBINE AND WIND TURBINE

BACKGROUND

Technical Field

The present invention relates to a rotor blade for a wind turbine. The present invention also relates to a vortex generator for a rotor blade, to a wind turbine, and to a method for optimizing a wind turbine.

Description of the Related Art

Rotor blades for a rotor of a wind turbine are generally known. Such rotor blades have a profile (cross-sectional profile) which allows for the special aerodynamic requirements.

To influence the aerodynamic properties of rotor blades, it is known to provide on the cross-sectional profile of the rotor blades vortex generators comprising multiple swirl elements which extend perpendicularly to the surface. The vortex generators serve for generating local regions of turbulent air flows over the surface of the rotor blade so as to effect an increase in the resistance to flow separation. For this purpose, vortex generators swirl the flow on the rotor blade that is near the wall, as a result of which the exchange of momentum between flow layers near the wall and remote from the wall is greatly increased and the flow speeds in the boundary layer near the wall increase. Due to the increased speeds near the wall, the flow is able to overcome pressure increases over a longer distance on the surface of the rotor blade.

EP 3 309 388 A1 has disclosed a rotor blade and a wind turbine of the type mentioned in the introduction. EP 3 309 388 A1 describes a rotor blade, with a suction side and a pressure side, for a wind turbine that has a rotor blade root of a hub region for attaching the rotor blade to a rotor hub and has a rotor blade tip, which is arranged side, facing away from the rotor blade root, of a tip region. The rotor blade has a cross-sectional profile on which multiple structurally identical vortex generators are arranged one next to the other sectionally in a longitudinal direction of the rotor blade. The vortex generators comprise swirl elements with a length and a height, which are arranged one next to the other in pairs. The swirl elements are in each case oriented at an angle to a main flow direction of the rotor blade, wherein the swirl elements which are arranged at the same angle have a constant lateral spacing to one another.

Rotor blades for wind turbines that have vortex generators or swirl elements are also known from US 2014/0328692 A1, US 2014/0328693 A1, U.S. Pat. No. 9,869,297 B2 and WO 2010/033018 A2.

At such blade sections with vortex generators, the rotor blade typically has significantly larger limit angles of attack, at which flow separation occurs at the trailing edge for the first time, than at blade sections where vortex generators are dispensed with. The vortex generators, as a result of their action, inevitably cause greater skin friction drag on the profile surface of the rotor blade, that is to say the drag coefficient of the cross-sectional profile increases significantly, and consequently the lift-to-drag ratio, the ratio of lift coefficient to drag coefficient, possibly even decreases. The increase in the drag coefficient or the decrease in the lift-to-drag ratio has a detrimental effect on the installation yield. In this regard, the influence of the lift-to-drag ratio or the drag coefficient on the power is ever increasing from the rotor blade root to the rotor blade tip. The further away the position on the rotor blade is from the rotor blade root in the direction of the rotor tip, the more important small drag coefficients or large lift-to-drag ratios are for the power and the yield of the wind turbine. Furthermore, the vortex generators can contribute to increased noise emissions.

BRIEF SUMMARY

One or more embodiments are directed to a rotor blade which is characterized by compensation for large variations in the angle of attack in the hub region and by large lift-to-drag ratios in the tip region.

Provided is a rotor blade, with a suction side and a pressure side, for a wind turbine is provided, wherein the rotor blade a rotor blade root of a hub region for attaching the rotor blade to a rotor hub, a rotor blade tip, which is arranged on a side, facing away from the rotor blade root, of a tip region, at least one vortex generator, which is arranged between the rotor blade root and the rotor blade tip, wherein the at least one vortex generator comprises swirl elements with a length and a height, which are arranged one next to the other in a longitudinal direction of the rotor blade and are in each case oriented at an angle to a main flow direction of the rotor blade. In the longitudinal direction of the rotor blade, the swirl elements have a lateral spacing to one another. A variation in the geometry of the swirl elements is realized in a manner dependent on a respective distance between the arrangement of the swirl elements and the rotor blade root.

The invention is based on the consideration that a wind turbine cannot be operated at a steady-state operating point, but rather is subjected to different influences, which result in continuous changing of the aerodynamic operating point. Angles of attack over the cross-sectional profile of the rotor blade vary permanently during the operation of the wind turbine. In particular parameters such as incident-flow turbulence, horizontal and vertical shear of the bottom boundary layer and the air density influence the angle-of-attack distribution. Over the rotor blade, the effects of the changes to these parameters are non-uniform in this case. Small-scale incident-flow turbulence and changes in the air density, for example, result in a lowering of the high-speed rotational speed, which in turn leads to the angle of attack varying to a greater extent in the hub region than in the tip region.

In order, in the case of a use of passive flow measures, as is constituted by the arrangement of vortex generators, to increase the complexity of the flow-influencing measure in comparison with the prior art, provision is made for a variation in the geometry of the swirl elements in a manner dependent on a respective distance between the arrangement of the swirl elements and the rotor blade root. The adaptation of the geometry of the swirl elements in a manner dependent on their spacing to the rotor blade root allows an advantageous adaptation to the boundary conditions at the rotor blade prevailing in each case in the rotor sections between the hub region and the tip region. Distance-dependent changing of the geometry of the swirl elements makes it possible for different lift coefficients and lift-to-drag ratios to be realized. These profile coefficient properties, which are achieved in particular through modification of the dimensions of the swirl elements of the vortex generator, precisely meet the requirements at the rotor blade.

Preferably, the swirl elements are, in pairs, oriented at an angle to the main flow direction of the rotor blade that is in each case formed substantially in the opposite direction, wherein the lateral spacing is determined between swirl elements arranged one next to the other at substantially the same angle. The pairwise arrangement of swirl elements ensures particularly effective generation of vortices, in particular that oppositely rotating vortices are generated adjacent to one another. It is of course also possible for use to be made of the lateral spacing between two individually designed swirl elements which are not formed in a paired manner.

Preferably, the variation in the geometry of the swirl elements may stem from a ratio of the lateral spacing to the length of the swirl element, with the ratio being able to be determined as a function of the distance. An increase in the ratio with increasing distance from the rotor root, in this case by way of a reduction in the length or an increase in the spacing between identically oriented swirl elements, results in a reduction in the maximum attainable angles of attack in favor of improved lift-to-drag ratios. For a small ratio of the lateral spacing to the length of the swirl element, large maximum angles of attack are permissible in the hub region.

Furthermore, the variation in the geometry of the swirl elements may stem from a ratio of the lateral spacing to the height, which ratio is likewise able to be determined as a function of the distance. Correspondingly, a change of the ratio in a manner dependent on the distance from the rotor root, in this case by way of a change of the height of the swirl elements or a variation of the spacing between identically oriented swirl elements, allows an adaptation of the maximum attainable angles of attack in favor of improved lift-to-drag ratios.

The relatively small ratio of lateral spacing to length in the hub region makes it possible to cover the large variations in angle of attack there during operation of the wind turbine with reduced flow separation. There, the unfavorable lift-to-drag ratios are of secondary importance for the yield of the installation. Further outward, lowering of the maximum permissible angle of attack, as occurs with an increase in the ratio of the lateral spacing to length or height, is acceptable since, there, the operationally induced variations in angle of attack also decrease, this then being accommodated however through the successively increasing influence of large lift-to-drag ratios on the yield.

Preferably, the variation in the geometry of the swirl elements stems from a ratio of the lateral spacing to the angle to the main flow direction of the rotor blade, which ratio is able to be determined as a function of the distance.

The different forms of the variation in the geometry may be provided individually, independently or in combination with one another.

In particular, the ratio of the lateral spacing to the length and/or of the lateral spacing to the height of the swirl elements may increase with increasing distance, and/or the ratio of the lateral spacing to the installation angle of the swirl elements may increase with increasing distance. The installation angle is to be understood as being in particular the angle of the swirl element to the main flow direction.

Preferably, the swirl elements may have a substantially triangular or fin-like profile.

Preferably, the length and/or the height and/or the installation angle of the swirl elements may be substantially constant. The geometrical variation may then preferably be realized via the variation in the lateral spacings between adjacent swirl elements. It is consequently possible for merely one type of swirl element to be used and for the advantages according to the invention still to be achieved. Furthermore, a reduction in errors and instances of incorrect mounting on the construction site by mixing up swirl elements and advantages during production are achieved, since merely one tool needs to be provided for producing the swirl elements, for example using an injection-molding process. Particularly preferably, as mentioned, the swirl elements are provided in pairs with a common base, for example in one piece as an injection-molded part.

Particularly preferably, the swirl elements, in particular in pairs, are identical, that is to say have identical length, height and installation angle over the rotor blade length. It is also conceivable for there to be multiple types of swirl elements, wherein preferably the spacing between the swirl elements increases with increasing distance from the rotor blade root.

Preferably, the variation in the geometry of the swirl elements may stem from a ratio of the lateral spacing to an internal angle at a tip, at a distance from a surface of the rotor blade, of the swirl element, which ratio is able to be determined as a function of the distance. The internal angle at the tip allows a statement to be made on how high, that is to say how large in extent perpendicular to the surface of the rotor blade, the swirl element is in relation to its length, that is to say to the extent in the plane of the surface of the rotor blade, in particular in the case of a substantially triangular or fin-shaped profile.

Furthermore, the at least one vortex generator may comprise at least one base plate, on which the swirl elements are arranged in pairs. It is consequently possible to produce for different rotor sections vortex generators whose swirl elements have a ratio of lateral spacing to length and/or of lateral spacing to height that is adapted to the individual rotor sections.

A vortex generator for a rotor blade of a wind turbine is also proposed, wherein the vortex generator has a base plate with a front edge and with a rear edge, wherein the front edge, in the intended orientation on the rotor blade, faces in the direction of the leading edge, and wherein the rear edge, in the intended orientation on the rotor blade, faces in the direction of the trailing edge, and in this way an orientation of the base plate is fixed from the rotor blade root to the rotor blade tip, wherein multiple swirl elements are arranged on the base plate. A variation in the geometry of the swirl elements on the base plate is realized in a manner dependent on a respective distance between the arrangement of the swirl elements and the rotor blade root.

The swirl elements are preferably arranged in pairs, wherein particularly preferably multiple pairs are arranged on a base plate.

The direction of the base plate or of the front edge and of the rear edge thereof is not necessarily completely parallel to a longitudinal direction of the rotor blade. For example, the base plate may also be configured so as to be parallel to the trailing edge of the rotor blade or inclined at a particular angle, for example up to 20°, preferably less than 10°, to the longitudinal direction and/or the trailing edge.

A wind turbine is also proposed, which is equipped with one or more rotor blades according to at least one of the above-described embodiments and/or with at least one vortex generator. What is proposed in particular is a wind turbine having three rotor blades of which each rotor blade is designed according to one of the above embodiments.

Finally, a method for optimizing a wind turbine is proposed, wherein the wind turbine has a rotor blade, with a suction side and a pressure side, for a wind turbine, and wherein the rotor blade has: a rotor blade root of a hub region for attaching the rotor blade to a rotor hub, a rotor blade tip, which is arranged on a side, facing away from the rotor blade root, of a tip region, and at least one vortex generator, which is arranged between the rotor blade root and the rotor blade tip. The at least one vortex generator comprises swirl elements with a length and a height, which are arranged one next to the other in a longitudinal direction of the rotor blade and are in each case oriented at an angle to a main flow direction of the rotor blade, wherein the swirl elements have a lateral spacing to one another. The method is characterized in that a variation in the geometry of the swirl elements is realized in a manner dependent on a respective distance between the arrangement of the swirl elements and the rotor blade root.

BRIEF DESCRIPTION OF THE SEVERAL VIEWS OF THE DRAWINGS

Further examples and advantages will be described below with reference to the appended figures. In the figures.

DETAILED DESCRIPTION

Figure 1:
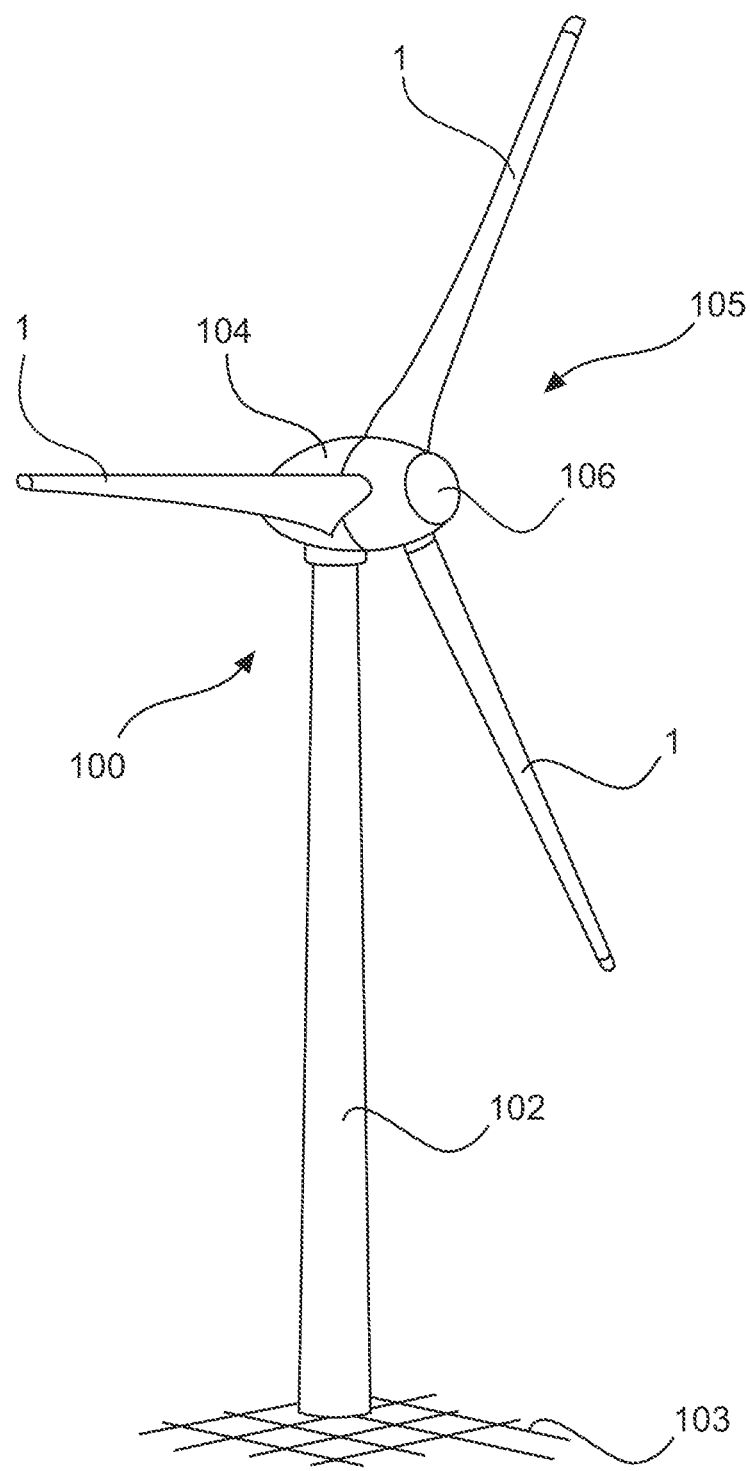
FIG. 1 shows a schematic illustration of a wind turbine.

FIG. 1 shows a wind turbine 100 having a tower 102 which is erected on a foundation 103. At the upper end situated opposite the foundation 103, there is situated a nacelle 104 (machine housing) with a rotor 105, which has a rotor hub 106 and rotor blades 1 attached thereto, which rotor blades are described in more detail with reference to the further figures. The rotor 105 is coupled to an electrical generator in the interior of the nacelle 104 for the purpose of converting mechanical work into electrical energy. The nacelle 104 is mounted rotatably on the tower 102, whose foundation 103 provides the required stability.

Figure 2:
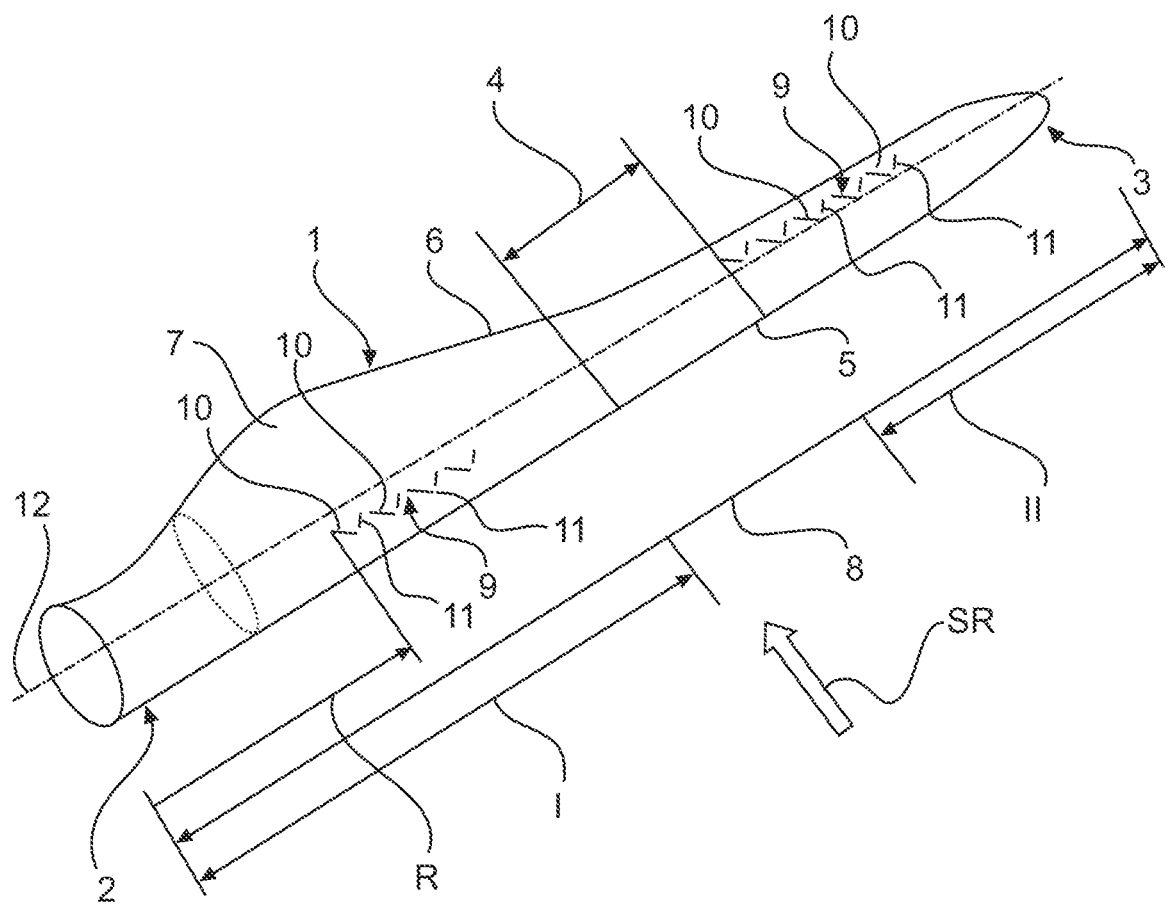
FIG. 2 shows a schematic illustration of a rotor blade.

FIG. 2 shows a schematic illustration of a rotor blade 1 of an embodiment. The rotor blade 1 has at one end the rotor blade root 2 and at the end facing away therefrom a rotor blade tip 3. At the rotor blade root 2, or in general in the region near the rotor blade root 2, the rotor blade 1 has a large profile depth. At the rotor tip 3, the profile depth is, by contrast, very much smaller. Proceeding from the rotor blade root 2, which may also be referred to as profile root 2, the profile depth decreases significantly up to a middle region 4, in this example after increasing in the blade interior region. A parting point (not illustrated here) may be provided in the middle region 4. From the middle region 4 up to the rotor blade tip 3, the profile depth is approximately constant, or the decreasing of the profile depth is significantly reduced. The rotor blade 1 has a for example substantially convex suction side 7, a for example substantially concave pressure side, a leading edge 5 and a trailing edge 6. The pressure side and/or the suction side may also be straight or have a different shape. A total length of the rotor blade 1 is denoted by 8.

The illustration in FIG. 2 furthermore shows vortex generators 9 arranged on the suction side 7 of the rotor blade 1. The vortex generators 9 comprise swirl elements 10, 11 which are arranged one next to the other in pairs. The respective swirl elements 10, 11 sectionally extend between the leading edge 5 and the trailing edge 6 and are in each case oriented at an angle to the main flow direction SR of the rotor blade 1 around which flow passes, such that the pairs of swirl elements 10, 11 have a profile which widens from the leading edge 5 to the trailing edge 6.

In this example, the swirl elements 10, 11 extend perpendicularly to the surface of the rotor blade 1, wherein angles other than right angles between the swirl elements 10, 11 and the surface of the rotor blade 1 are also possible. While the vortex generators 9 in the example are shown arranged on the suction side 7, vortex generators 9 on the pressure side are alternatively or additionally also possible.

The swirl elements 10, 11 are arranged at a distance R from the rotor hub or the rotor blade root 2. Proceeding from the rotor blade root 2, a hub region I of the rotor blade 1 extends substantially up to the middle region 4. A tip region II of the rotor blade 1 extends substantially from the middle region 4 up to the rotor blade tip 3.

Figure 3:
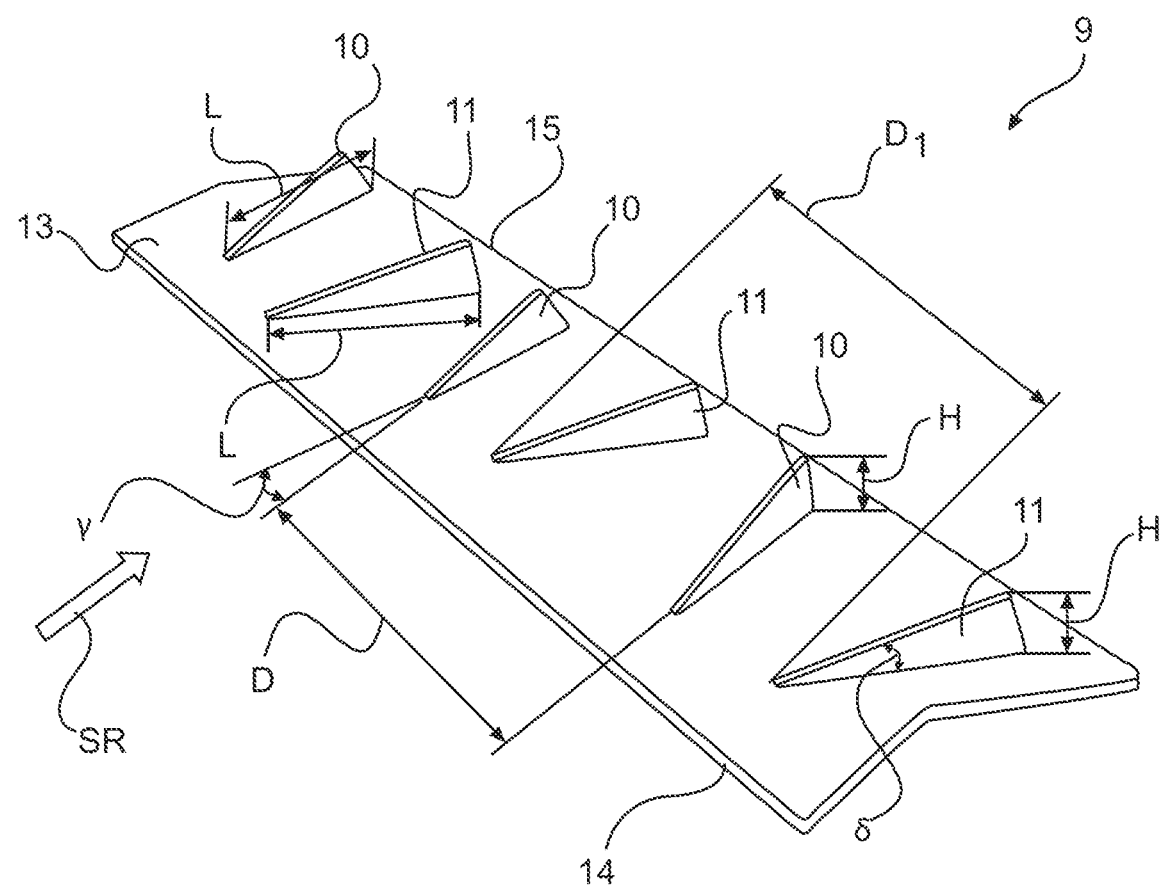
FIG. 3 shows a schematic illustration of a vortex generator.

FIG. 3 shows a schematic illustration of an embodiment of a vortex generator 9 in a perspective view. The vortex generator 9 may have at least one base plate 13, which serves for the attachment of the vortex generator 9 to the surface of the rotor blade 1. The base plate 13 has a front edge 14 and a rear edge 15. Between the front edge 14, which, in a position mounted on the rotor blade 1, faces the leading edge 5, and the rear edge 15, faces the trailing edge 6, there extend the respective swirl elements 10, 11, which have a contour which is substantially triangular or fin-like in this example.

The swirl elements 10, 11 each have a height H, wherein the height profile increases to a maximum value in the direction of the rear edge 15 of the base plate 13, and have a length L which denotes the extent of the respective swirl element 10, 11 between the leading edge 14 and the trailing edge 15 or in the rotor blade plane.

The swirl elements 10, 11 arranged in each case one next to the other in pairs are arranged inclined at an angle y to the main flow direction SR, wherein, proceeding from the front edge 14, a widening profile of the adjacent swirl elements 10, 11 is established up to the rear edge 15. Two swirl elements 10, 11 arranged one next to the other have a substantially symmetrical orientation with respect to the main flow direction SR, that is to say that one swirl element 10 of the swirl elements 10, 11 arranged in pairs points outward in the longitudinal direction of the rotor blade and a further swirl element 11 points inward in the longitudinal direction of the rotor blade. A lateral spacing between two tips of two swirl elements 10 or 11 which are oriented substantially in the same direction is denoted by a reference sign D or $D_1$. The internal angle δ at the tip of the swirl elements 10, 11 allows a statement to be made on how high H the swirl element is in relation to its length L.

Vortex generators form a passive measure for influencing of flow in that, in general, the swirl elements, arranged with identical lateral spacings, of the vortex generators effect swirling of the boundary layer flow, since the swirl elements are arranged inclined at an angle to the main flow direction. The vortex generators swirl the flow on the rotor blade that is near the wall, as a result of which the exchange of momentum between flow layers near the wall and remote from the wall is greatly increased and the flow speeds in the boundary layer near the wall increase. Due to the increased flow speeds near the wall, the flow is able to overcome pressure increases over a longer distance on the surface of the rotor blade. This increases the resistance to flow separation.

A wind turbine does not operate at a steady-state operating point, but rather is constantly subjected to different influences, which result in continuous changing of the aerodynamic operating point at the rotor blade 1. Angles of attack α at the rotor blade 1 over the blade radius vary continuously during operation of the installation. In particular parameters such as incident-flow turbulence, horizontal and vertical shear of the bottom boundary layer and the air density, to mention only the most important parameters, influence the angle-of-attack distribution at the rotor blade 1. In this regard, small-scale incident-flow turbulence or changes in the air density result in a lowering of the high-speed rotational speed, which leads to the angle of attack α varying to a greater extent in the inner region, that is to say from the hub region I up to the middle region 4, of the rotor blade 1 than in the outer region, that is to say from the middle region 4 up to the tip region II, of the rotor blade 1. Therefore, greater reserves are provided for the angle of attack α during operation in the inner region of the rotor blade 1 than in the outer region of the rotor blade 1. Accordingly, the vortex generators 9 are used in particular in the inner region of the rotor blade 1. The vortex generators 9 lengthen, through the increase in resistance to flow separation, the region of use of the profile of the rotor blade 1, the so-called linear branch, in which there is a proportional relationship between lift and angle of attack.

Furthermore, from the rotor blade root 2 to the rotor blade tip 3 of the rotor blade 1, there is an ever-increasing influence of the lift-to-drag ratio ε or drag coefficient $c_W$ on the power. As the distance from the rotor blade root 2 increases, it is essential for the power and the yield of the installation to achieve small drag coefficients $c_W$ or large lift-to-drag ratio ε.

For reliable operation of a wind turbine, compensation must be provided for large variations in angle of attack in the inner region of the rotor blade 1, which can be ensured by rotor blades 1 having the vortex generators 9 arranged thereon. The disadvantage of reduced lift-to-drag ratios ε, when using vortex generators 9, is tolerable in the inner region of the rotor blade 1, since the influence of the lift-to-drag ratio ε on the installation yield is negligible in the inner region of the rotor blade 1. The further outward the position on the rotor blade 1 is, the smaller the angle-of-attack ranges which have to be covered become, and the greater the influence of the lift-to-drag ratio ε on the yield of the wind turbine becomes. To allow for these circumstances, the dimensioning of the swirl elements 10, 11 is realized in a manner dependent on the respective distance R between the arrangement of the swirl elements 10, 11 and the rotor blade root 2. This means that with increasing distance R from the rotor hub or the rotor blade root 2, the geometrical dimensions height H, length L and/or lateral spacing D of the swirl elements 10, 11 are changed.

Here, a ratio V of lateral spacing D to height H or of lateral spacing D to length L is varied, wherein the ratio V of lateral spacing D to height H or of lateral spacing D to length L increases with increasing distance R. In the rotor hub region I, a small ratio V of lateral spacing D to height H or of lateral spacing D to length L is selected, such that it is possible to cover the large variations in angle of attack there during operation of the wind turbine without flow separation. By contrast, with increasing distance R, reduction of the maximum permissible angle of attack, as occurs with an increase in the ratio V of lateral spacing D to height H or of lateral spacing D to length L, is acceptable. This is because, with increasing distance R from the rotor hub, the operationally induced variations in angle of attack also decrease, this then being accommodated however through the successively increasing influence of large lift-to-drag ratios on the yield.

In an alternative embodiment, an angle γ at which the swirl elements 10, 11 are positioned with respect to the main flow direction SR is likewise or alternatively varied with increasing distance R from the rotor hub or the rotor blade root 2. In particular, a smaller angle with respect to the main flow direction SR is provided with increasing distance R.

Figure 4:
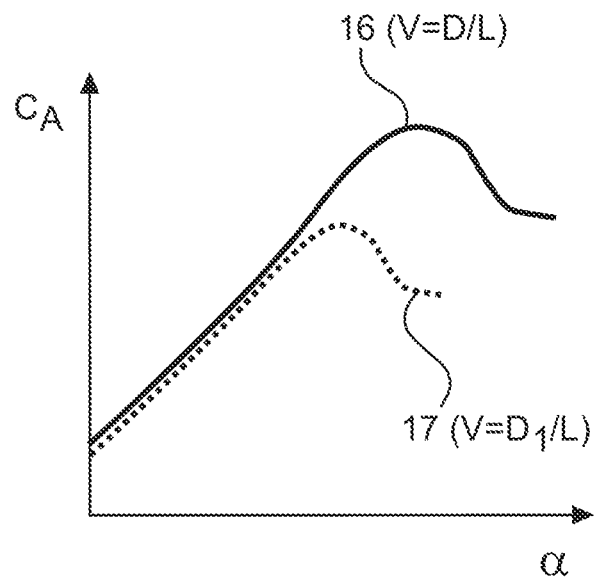
FIG. 4 shows two schematic curves of a lift coefficient against an angle of attack for a profile with vortex generators.
Figure 5:
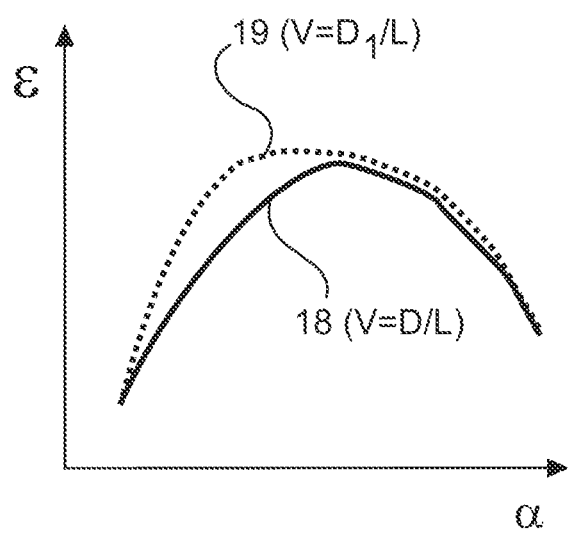
FIG. 5 shows two schematic curves of a lift-to-drag ratio against the angle of attack for a profile with vortex generators.

FIGS. 4 and 5 respectively illustrate two curves, 16, 17 and 18, 19, respectively, of lift coefficient $c_A$ and lift-to-drag ratio ε against the angle of attack α for a rotor blade 1 equipped with vortex generators 9, for in each case two different ratios V of lateral spacing D to height H. The curves 16 and 18 were determined for a first ratio V of lateral spacing D to height H, while the curves 17 and 19 were determined for a second ratio V of lateral spacing $D_1$ to height H, where the lateral spacing $D_1$ is larger than the lateral spacing D.

It can be seen from the curves 16 and 17 compared in FIG. 4 that the maximum lift coefficient $c_A$ decreases with increasing ratio V of lateral spacing D to height H. By contrast, the curves 18 and 19 compared in FIG. 5 show that the maximum attainable lift-to-drag ratio ε over a wide angle-of-attack range increases. Consequently, if the ratio V of lateral spacing D to height H or of H or lateral spacing D to length L of the swirl elements 10, 11 in the hub region I of the rotor blade 1 is selected to be small, large maximum angles of attack α are permissible in this profile section of the rotor blade 1, this being associated however with a reduced lift-to-drag ratio ε. If the ratio of lateral spacing D to height H or of H or lateral spacing D to length L is increased toward the blade tip 3, then the maximum attainable angles of attack α are reduced in favor of improved lift-to-drag ratios ε.

Figure 6:
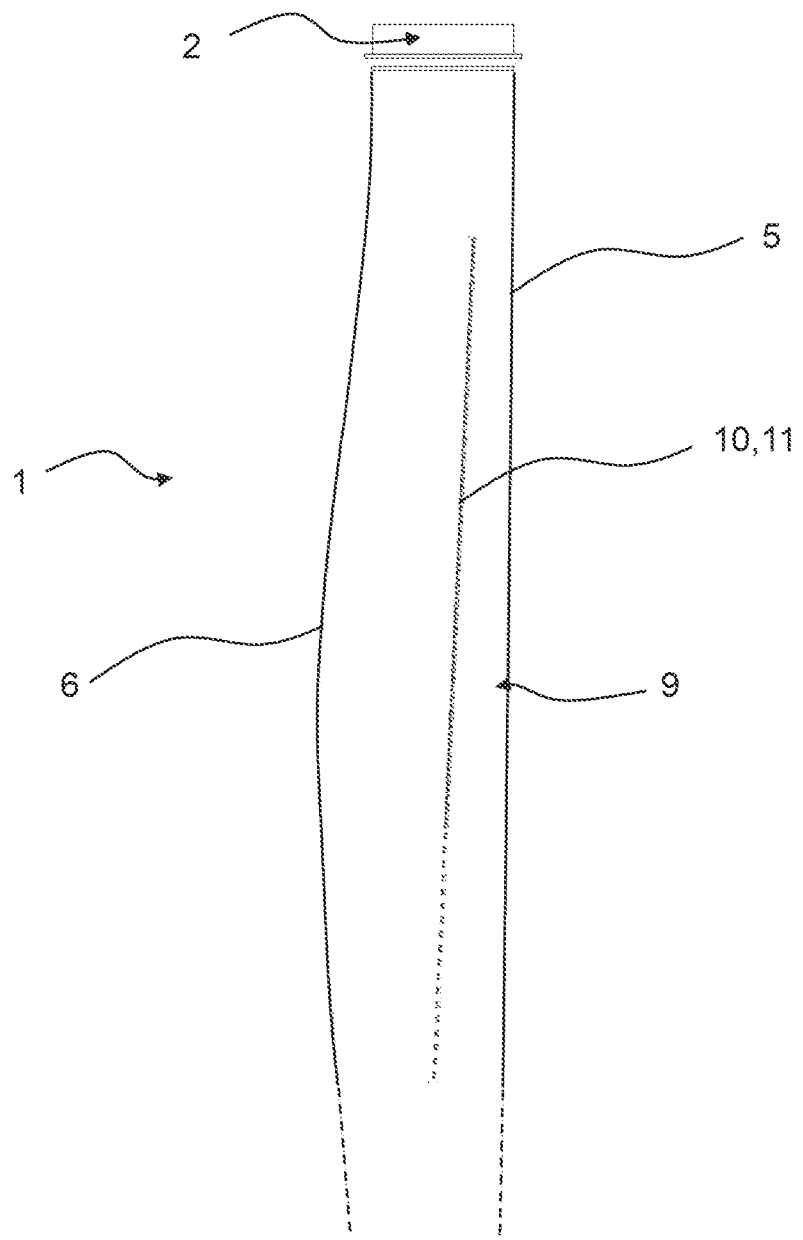
FIG. 6 shows a schematic illustration of a rotor blade.

FIG. 6 schematically shows a rotor blade 1 for which the spacing between pairs of swirl elements 10, 11 increases with increasing distance from the rotor blade root 2. The swirl elements 10, 11 are substantially identical, that is to say are mounted at the same angle and have identical heights H and lengths L, over the entire distance in the direction of the rotor blade longitudinal direction.

Through the use of merely one type of swirl element 10, 11, provided in particular in pairs, the mounting, for example on a construction site, can be simplified, since the risk of mixing up and incorrectly mounting the swirl elements 10, 11 is reduced. Also, advantages in terms of production technology are associated therewith since merely one production tool is required, for example in the case of manufacture using injection molding techniques.

Furthermore, the embodiment in FIG. 6 may be combined with all the other geometrical variations described while achieving the advantages associated therewith.

A gust of wind impinging on the wind turbine, that is to say a change in velocity in the incident flow, causes a change in the effective angle of attack at the rotor blade 1 while this is being operated. The effective angle of attack results from the vector addition of circumferential velocity and inflowing wind velocity. The ratio of circumferential speed to wind speed therefore determines whether a change in velocity in the incident flow leads to a large or a small change in the effective angle of attack.

At the rotor blade root 2, a gust results in a large change in the effective angle of attack, since the incident-flow speed in relation to the circumferential speed is high. At the outer blade in the vicinity of the rotor tip 3, where the circumferential speed is higher by several orders of magnitude and the incident-flow speed in relation thereto is correspondingly significantly lower, the same gust of wind leads only to a small change in the effective angle of attack.

For this reason, it is necessary to configure vortex generators 9 on the inner blade in such a way that they result in the greatest possible angle-of-attack reserve. This can also be expressed by a desired profile polar which is free of separation for as long as possible, and is the case with a relatively small spacing between the vortex generators 9. The additional drag which arises as a result and the reduced lift-to-drag performance resulting therefrom are of little importance for the power of the wind turbine at the low circumferential speeds.

At the outer blade in the vicinity of the rotor tip 3, reduced additional angle-of-attack reserves are required for the reasons stated. Moreover, an excessively large drag on the rotor blade 1 where high circumferential speeds occur would have significantly greater negative effects on the rotor power than at the rotor blade root 2. Therefore, in this region, there are preferably provided increasing spacings between the vortex generators 9, as a result of which, due to smaller drag, a better lift-to-drag performance and a slightly reduced widening of the angle of attack up to the point of stall occur.

Alternatively or additionally, the use of smaller vortex generators 9 toward the outside is also expedient, particularly preferably in combination with an enlargement of the spacing toward the outside, even with the vortex generators 9 being reduced in size toward the outside. Particularly preferably, the vortex generators 9 are selected from 3 to 5 available different sizes of vortex generators 9, so that the complexity, for example in the case of storage and mounting, remains manageable.

With regard to the noise generated, it is the case that the greater the number of vortex generators 9 exposed to the wind, the greater the amount of noise that is produced. It is furthermore the case that the higher the wind speed, the greater the amount of noise generated by each individual vortex generator 9. A density of vortex generators 9 toward the outside that is lower in comparison with the rotor blade root 2 is therefore also preferable from an acoustic point of view.

For the blade design of a rotor blade 1, the aim is also for the power-optimal value of ⅓ to be kept for the induction factor over the radius. Due to the low speed, this is possible in the region of the rotor blade root 2 only by increasing the profile depth, which is possible only to a limited extent for transport reasons, or by increasing the lift coefficients. Therefore, the power-optimal rotor with limited maximum depth at the rotor blade root 2 must always be designed in such a way that the largest possible lift coefficients are achieved in the root region.

The invention claimed is:

1. A rotor blade for a wind turbine, comprising:
a suction side;
a pressure side;
a rotor blade root of a hub region configured for attaching the rotor blade to a rotor hub;
a rotor blade tip, which is arranged on a side, facing away from the rotor blade root, of a tip region; and
at least one vortex generator arranged between the rotor blade root and the rotor blade tip,
wherein the at least one vortex generator comprises swirl elements with a length and a height, wherein the swirl elements are arranged one next to the other in a longitudinal direction of the rotor blade and are in each case oriented at an angle to a main flow direction of the rotor blade, wherein, in the longitudinal direction of the rotor blade, the swirl elements have a lateral spacing to one another, wherein the at least one vortex generator further comprises a base plate on which the swirl elements are in pairs, oriented at an angle to the main flow direction of the rotor blade that is in each case formed substantially in the opposite direction, wherein the lateral spacing is determined between swirl elements arranged one next to the other at substantially a same angle,
wherein a variation in the geometry of the swirl elements is realized in a manner dependent on a distance between the arrangement of the swirl elements and the rotor blade root, and
wherein the variation in the geometry of the swirl elements stems from a ratio of the lateral spacing to the angle to the main flow direction of the rotor blade, wherein the ratio is able to be determined as a function of the distance, wherein a ratio of the lateral spacing to the height of the swirl elements increases with increasing distance.

2. The rotor blade as claimed in claim 1, wherein the variation in the geometry of the swirl elements stems from a ratio of the lateral spacing to the length, wherein the ratio of the lateral spacing to the length is able to be determined as a function of the distance.

3. The rotor blade as claimed in claim 1, wherein the variation in the geometry of the swirl elements stems from a ratio of the lateral spacing to the height, wherein the ratio is able to be determined as a function of the distance.

4. The rotor blade as claimed in claim 2, wherein a ratio of the lateral spacing to an installation angle of the swirl elements increases with increasing distance, wherein the installation angle is the angle of the swirl elements to the main flow direction.

5. The rotor blade as claimed in claim 4, wherein at least one of the length, the height, or the installation angle of the swirl elements is substantially constant.

6. The rotor blade as claimed in claim 1, wherein the swirl elements have a substantially triangular or fin-shaped profile.

7. The rotor blade as claimed in claim 1, wherein the variation in the geometry of the swirl elements stems from a ratio of the lateral spacing to an internal angle at a tip, at a distance from a surface of the rotor blade, of the swirl element, wherein the ratio of the lateral spacing to an internal angle at a tip is able to be determined as a function of the distance.

8. A wind turbine having a rotor, wherein the rotor has at least one rotor blade that is the rotor blade as claimed in claim 1.

9. A method comprising:
optimizing a wind turbine, wherein the wind turbine has a rotor blade, with a suction side and a pressure side, for a wind turbine, wherein the rotor blade has:
a rotor blade root of a hub region for attaching the rotor blade to a rotor hub;
a rotor blade tip, which is arranged on a side, facing away from the rotor blade root, of a tip region; and
at least one vortex generator arranged between the rotor blade root and the rotor blade tip,
wherein the at least one vortex generator comprises swirl elements with a length and a height, wherein the swirl elements are arranged one next to the other in a longitudinal direction of the rotor blade and are in each case oriented at an angle to a main flow direction of the rotor blade,
wherein the swirl elements have a lateral spacing to one another, wherein the at least one vortex generator further comprises a base plate on which the swirl elements are in pairs, oriented at an angle to the main flow direction of the rotor blade that is in each case formed substantially in the opposite direction, wherein the lateral spacing is determined between swirl elements arranged one next to the other at substantially a same angle, wherein a variation in the geometry of the swirl elements is realized in a manner dependent on a distance between the arrangement of the swirl elements and the rotor blade root, and wherein the variation in the geometry of the swirl elements stems from a ratio of the lateral spacing to the angle to the main flow direction of the rotor blade, wherein the ratio is able to be determined as a function of the distance, wherein a ratio of the lateral spacing to the height of the swirl elements increases with increasing distance.

10. The rotor blade as claimed in claim 3, wherein the ratio of the lateral spacing to the height increases with increasing distance.

* * * * *